8240X

No Printed Specification Available

T. CLAXTON.

AIR PUMP.

Patented June 7, 1834.

THE NORRIS PETERS CO., PHOTO-LITHO., WASHINGTON, D. C.

Timothy Claxton, Boston, Massachusetts.
Letters Patent.
Dated June 7th 1834.

The Schedule referred to in these Letters Patent and making part of the same, containing a description in the words of the said Timothy Claxton, himself, of his improvement in the Air Pump.

---

To all persons to whom these presents shall come: Timothy Claxton of Boston, in the County of Suffolk, and State of Massachusetts, Philosophical Instrument maker, sends greeting:

Be it known that I the said Timothy Claxton, have invented made and applied to use certain improvements in the "air pump" which I have described and set forth in the following words, and annexed drawings which taken together form my specification.

Figure 1:
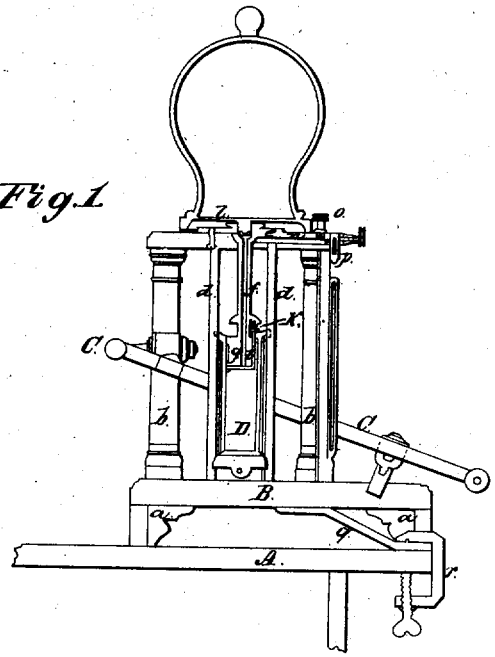

Fig. 1. Represents a section of the pump and receiver.

Figure 2:
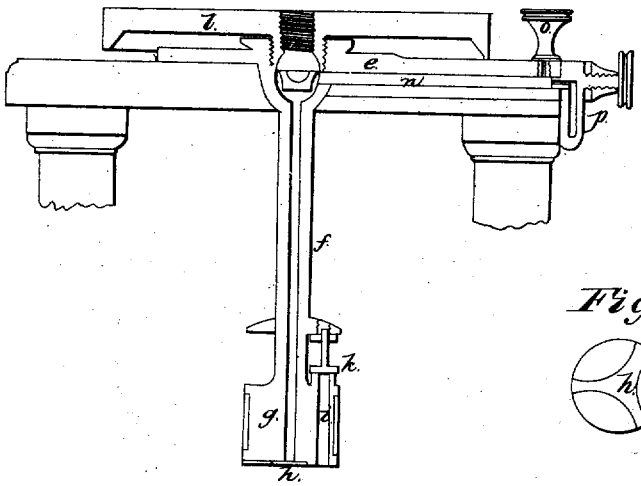

Fig. 2. A section on a larger scale of the piston, pump plate, and passage to the gauge, denoting the degree of exhaustion of the air in the receiver.

Figure 3:
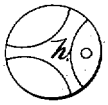

Fig. 3. A view of the valve in the bottom of the piston.

Figure 4:
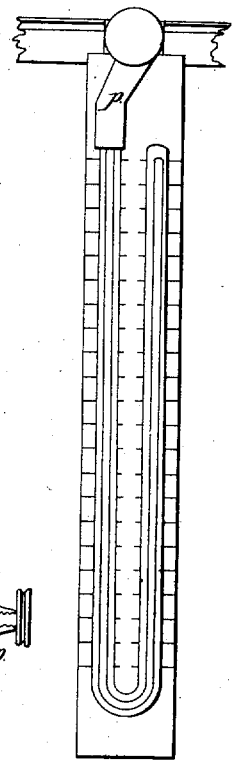

Fig. 4. A view of the gauge.

A. Fig 1. denotes the table on which the pump rests. B, represents the foundation board of mahogany, which in my present form is fourteen inches long and ten inches wide, one and one quarter inch thick, being raised and supported one and one half inch from the table by four feet, a, a, a, a. On this board stand four pillars b, b, b, b, ten and three quarter inches high, which support a mahogany board nine inches square and three fourths of an inch thick. The whole frame is held firmly together by iron bolts (with brass heads) passing through the shafts of the pillars, and having screws and nuts at their lower extremities. The two back pillars besides acting as supports to the top board serve to sustain the fulcra or bearings c, c, of the lever C, and are placed at a convenient distance above the lower board and back from the centre of the pillars. The bearings of the lever, may be of brass or other suitable metal of a spherical form with holes drilled through to receive the axis of lever, the other ends terminating in a flat shank having a hole in it to permit the passage through of the iron bolt. This shank has a broad shoulder behind the ball which rests against the pillar (made flat for the purpose) and is secured by a screw and nut at its other extremity. The lever C, is of cast iron or other suitable metal, open in the centre to admit the barrel and gauge, and having at its end a handle by which the operator puts the pump in action To the lever is connected two rods by joints at their upper ends, the lower ends of which are attached by similar joints to the bottom of the barrel D, so that when the lever is moved the barrel is allowed to traverse upwards and downwards between the guide rods d, d, in a perpendicular direction.

The barrel D, is a plain hollow cylinder of brass open at top and closed at bottom, properly ground out to receive the piston and to be air tight during its motions.

The guides d, d, are parallel steel rods properly secured at their tops into the upper board of the frame, and at their opposite ends into the lower board of the same. The barrel has at its top and bottom, two flanches or projections to which fluted pieces of composition of the length of the barrel, are attached. These fluted pieces of composition are accurately fitted to the guide rods so as to ensure the rectilinear motion of the barrel.

On the top board of the frame a triangular brass plate, c, is secured by screws passing through it into nuts on the underside of the board. From the bottom of this brass plate, c, a round rod, f, projects terminating in a piston g, A small hole is drilled through the centre of this rod and piston, through which the air is conducted from the receiver to the barrel. At the lower end of the piston there is a valve h, (of the form represented in Fig. 3.) to prevent the return of the air into the receiver. The air, when the barrel is raised escapes from the same through the passage i, which is a circular hole bored in the piston, terminating at the top in a small seat, on which rests a valve k. The said valve K, during the downward motion of the barrel is closed by the pressure of the external air.

In the centre of the triangular plate, c, is screwed the brass receiver plate l. To intercept any dirt, broken glass or other substances which might accidently fall into the hole in the top of the receiver plate, the inside of the piston rod, at its connection with the triangular plate, c, is hollowed out in the form of a small chamber into which a small brass cup m, is dropped, before attaching the ground plate. The sides of this cup are grooved to admit the passage of the air around it, and it may be easily removed at any time should

8240 X any extranious matter fall into it.

A tube n, connects the receiver with the gauge terminating at its end in a "gallows" (of the kind invented by Professor Hare) by which the gauge is secured. A screw O, for the admission of air is placed on the top of the connection tube.

The gauge consists of a bent glass tube (each leg being about ten inches long) sealed at one end and open at the other which is fitted into a proper brass cup p, against which the gallows screw acts to confine the gauge to the connection tube. The sealed leg is filled with mercury except about a third of an inch at the top which is occupied by a portion of air, the mercury extending about an inch upwards from the bend of the tube into the opposite leg. A communication being formed as before mentioned between the upper surface of the mercury and receiver, the degree of exhaustion in the expansion receiver is denoted by the ~~exhaustion~~ of air in the sealed leg of the gauge, and may be read of from the index scale from the back of the same.

In fastening the pump to the table one end of a metal bar q, is attached to the most suitable part of the underside of the lower board, the other end extending to the table near its edge which it touches by a little pad affixed. A clamp r, being applied to the end of this bar confines the pump down to the table effectually and securely.

I have now described the arrangement which appears to be best, but there may be other modes adopted such as varying the valves so as to allow the air to escape at the bottom of the barrel. The barrel may be fixed to the triangular plate, and the piston moved by the same lever and connecting rods &c. without altering the general form or action of the pump, but what I claim as my inventions and improvements are:

First. The combination of a lever, connecting rods, piston or barrel, with suitable guides valves ground plate &c. together so as to constitute a "single barrel table air pump" whose operation is such that the act of exhausting the receiver presses the pump down on the table or stand upon which it is placed.

Second, A piston, as above described, to be used with the movable barrel, in which piston there are two passages for the air, one to pass into, and the other from the barrel and two valves to close these passages alternately.

Third, The application of a gauge, to act by the exhaustion of air, so as to

8240X indicate the degree of exhaustion in the receiver at any period of the operation.

Fourth, A method of fastening an air pump to the table as above described in such manner, that the pressure given by a screw clamp on a bar near the edge of the table is transferred to any part of the foundation board of the pump, at pleasure, to which the opposite end of the bar is attached.

In testimony that the above is a true specification of my said inventions and improvements, I have hereunto set my hand and seal this eighth day of May in the year of our Lord eighteen hundred and thirty four.

(Witnesses.)
Robert H. Eddy.
Calvin Brown.

Timothy Claxton.

Drawing.

Exd. (W.G.C.

(1530 Words)